July 28, 1942.                H. BUCHHOLZ                2,290,904
              METHOD OF FORMING METER DRUMS
                       Filed July 19, 1939
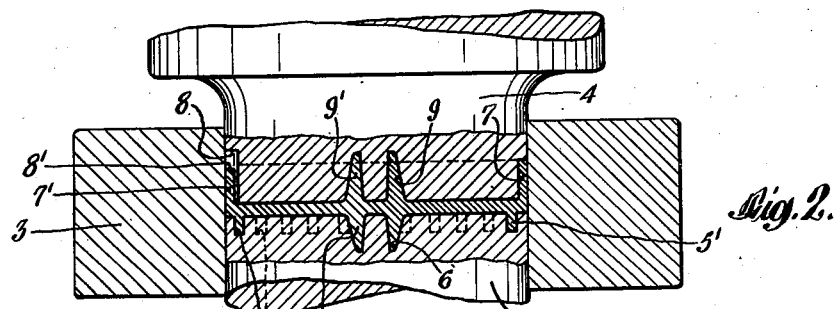
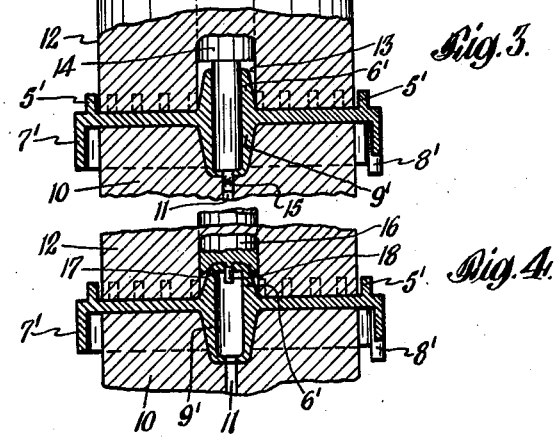
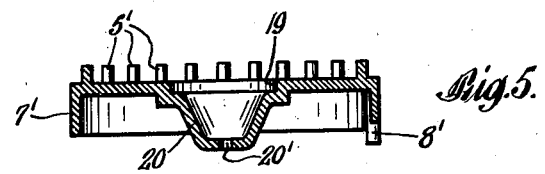
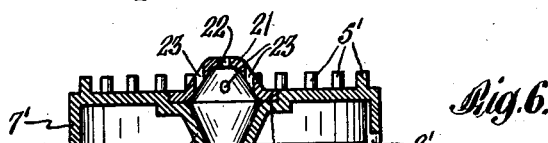
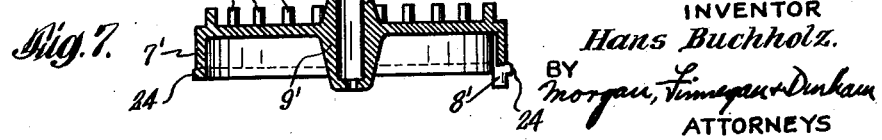
INVENTOR
Hans Buchholz.
BY Morgan, Finnegan & Dunham
ATTORNEYS Patented July 28, 1942

2,290,904

UNITED STATES PATENT OFFICE 2,290,904

METHOD OF FORMING METER DRUMS

Hans Buchholz, Zug, Switzerland, assignor to Landis & Gyr, A. G., Zug, Switzerland, a body corporate of Switzerland Application July 19, 1939, Serial No. 285,327
In Switzerland July 20, 1938

3 Claims. (Cl. 29—148.4)

The present invention relates to a new and useful method of producing small drums or number rollers such as are used in electricity metering apparatus.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrate embodiments of the invention, and together with the description, serve to explain the principles of the invention.

Of the drawing:

Fig. 1 shows a sectional view of the blank from which the drums are formed in accordance with the present invention;

Fig. 2 shows the partially formed drum after the first stage in its production;

Fig. 3 shows a further stage in the production of the drums according to the present invention;

Fig. 4 shows the final stage in the production of the drums;

Figs. 5 and 6 show successive stages of producing such drums according to a modified method forming part of the present invention; and Fig. 7 shows a further form of the invention.

In the production of number rollers or drums for electricity and other metering apparatus it is important that the drums should be light and run with as little friction as possible. Generally these drums are produced by die casting resulting in a rather heavy cumbersome drum which must then be provided with enlargements at the ends of the drum bosses or with other means to reduce the friction of the drums. It has also been proposed to make these drums by stamping or drawing them from sheet metal, but when this is done the gear teeth and other parts must be separately formed and later assembled resulting in complex manufacturing operations which made production difficult and expensive.

The present invention has for its objects the provision method of making drums for electricity and other metering apparatus which are light in weight, have a minimum of friction at their bearings and which can be economically and simply produced. The invention also provides a method of forming drums of integral construction and of exceedingly light weight.

It will be understood that the foregoing general description and the following detail description as well are exemplary and explanatory of the invention but are not restrictive thereof.

Referring now in detail to Figs. 1 to 4 of the accompanying drawing which shows one method in accordance with the present invention of producing the numbered drums:

The blanks for forming the drums comprise a sheet 1 of circular shape and sufficient thickness formed from a relatively light ductile metal such as aluminum. This disc 1 is placed on a stationary die 2, as in Fig. 2, which die is located within the closely fitting and surrounding sleeve 3 of a press. The die 2 is provided with depressions 5 arranged around its circumference and properly spaced slightly therefrom, and is also provided with a central annular depression 6. Above the die 2, alined therewith and adapted to be forced into the upper portion of the bore of sleeve 3 is a movable die or punch 4 provided with a head of slightly reduced diameter, and a central annular recess 9 in addition to two groove-like depressions 7 and 8.

After the disc 1 has been located on the upper surface of the die 2, the die 4 is forced downwardly so as to press the disc 1 between the dies 2 and 4 while it is confined by the surrounding sleeve 3. As the pressure is increased, the metal is forced, by forging or extrusion, into the tooth-like depressions 5, the annuli 6 and 9 and the grooves 7 and 8 so as to form a cup-like object provided on one side with teeth and on the other side with a cylindrical rim while at the center the object is provided with oppositely-extending, hollow and slightly conical projections.

The teeth-like members formed in the depressions 5 serve as the teeth of the crown gear for the tens transmission or transfer mechanism, while the upstanding cylindrical rim in groove 7 forms the surface onto which the numbers or other indicia may be applied, the projections in annuli 6 and 9 being adapted, after further working to form the bearing for the drum.

The workpiece is now removed from the die, turned over and placed on a stationary die 10 (Fig. 3), which is provided with a central depression to receive the part formed in the annulus 9 which serves to center the workpiece on the die. Die 10 is also provided with a bore 11 which passes to the center of the depression. The upper die for this stage of the operation is an alined die 12 having a central bore 13 of a sufficient size to receive the boss formed in annular 6 which projects into the bore 13 without touching the die 12. Bore 13 also serves as a guide for a mandrel 14 having a slightly greater diameter than the bosses 6 and 9 and of slightly conical shape terminating in a small cylindrical extension 15 adapted to extend and fit into the bore 11.

As the dies 10 and 12 are moved together, the mandrel 14 is moved downwardly until the cylindrical extension punch 15 enters the bore 11 and during this movement the mandrel enters the hollow interior of boss 6, widens it and displaces the metal, after which the mandrel breaks or punches through the wall formerly separating the bores of boss parts 6 and 9 and finally shaping the lower end of boss 9 and forming it with a punched bearing opening which is both smooth and of accurate dimension.

Following the completion of the work with dies 10 and 12, the workpiece may be left on the dies 10, and 12, but mandrel 14 is replaced by punch 16 having a central cylindrical projection 18 and a surrounding ring-shaped depression 17. As the punch 16 is lowered into engagement with boss part 6, the upper part of the boss is engaged by the depression 17 which turns or bends the upper edges thereof inwardly, and forces the edge against the cylindrical projection 18 so that, as shown in Fig. 4, the second and other bearing of the drum is formed.

The downward movement of the punch 16 can also be accompanied by a rotary movement so as to spin and polish the inwardly-flanged bearing surface if desired.

In accordance with the method illustrated in Figs. 1 to 4, the drum is formed integrally and by the illustrated operations except that suitable numbers or other indicia are later applied in any desired manner.

If desired, the second working stage may be carried out without forming the bosses as hollow cones, the hollow construction being provided by the members 13 and 14 as shown in Fig. 3, and of course the bearing holes may be formed by drilling if desired.

In accordance with the modified method shown in Figs. 5 and 6, the dies for forming the pins 5, the cylindrical flange 7 and the tooth gap 8 out of the flat disc 1 are so constructed as to form a groove-like depression 19 at the central part of the disc while the central part of the disc 1 is depressed to form a conical or tapered member terminating in a portion 20 which is apertured to form one bearing of the roller. In the next stage, a small cup-shaped disc 21 provided with a bearing hole 22 and cleaning holes 23, also preferably formed of light pressed aluminum is pressed into the depression 19 so that the holes 20 and 22 are in accurate alinement thereby producing the drum shown in Fig. 6 of the drawing.

In view of the necessity of very accurately machining the parts of the teeth gaps 8 of a number roller, in particular when this is to be used for electricity measuring appliances, there could be provided in the form with which the first working process takes place, a nose piece and a recess, so that in this working process a lateral addition could be formed on the disc 1 from the material thereof. The disc would then have to be so placed on the die 2 for the second working stage that the addition comes in a line with the groove-like depressions of the die 4. By means of this addition, there is in any case sufficient material at this point that on completing the second working stage, the groove-like depressions are entirely filled up.

The parts of the teeth gaps could also if necessary be pressed into their exact shape by a special pressing tool coming into operation in a working stage interposed after the second working stage.

A number roller made according to the process of the invention is naturally not limited in its use to electricity measuring appliances but can be used wherever easy running and light weight are important.

Fig. 7 of the drawing shows a further modification of the invention in which the method provides for the formation of a raised running flange adjacent one edge of the cylindrical surface of the drums. As embodied, the cylindrical periphery 7 pressed from the disc 1 is also provided with a raised flange 24 extending from which is the driver pin of the tens transmission, the flange serving to receive the teeth of the driver pinion of the tens transmission or transfer mechanism so that the pinion does not work upon the numbered surface 7 which is usually colored and of higher friction. Furthermore, the flange 24 may be turned or otherwise surfaced so as to run with absolutely true.

The invention in its broader aspects is not limited to the specific mechanisms shown and described but departures may be made therefrom within the scope of the accompanying claims without departing from the principles of the invention and without sacrificing its chief advantages.

What I claim is:

1. A method of forming number rolls or drums such as are used in meter mechanisms including forging or extruding the peripheral portions of a flat disc in opposite axial directions to form teeth on one side and a cylindrical flange on the other side, forging or extruding the central portion of the disc to form a boss and punching an aperture in the boss to form a central bearing aperture therein.

2. A method of forming number rolls or drums such as are used in meter mechanisms including forging or extruding the peripheral portions of a flat disc in opposite axial directions to form teeth on one side and a cylindrical flange on the other side, forging or extruding the central portion of the disc in opposite axial directions to form opposite axially extending bosses, punching a bearing aperture in one of the bosses and bending over the end of the other boss against a punch to form an alined bearing aperture.

3. A method of forming number rolls or drums such as are used in meter mechanisms including forging or extruding the peripheral portions of a flat disc in opposite axial directions to form teeth on one side and a cylindrical flange on the other side, forging or extruding the central portion of the disc in opposite axial directions to form opposite axially extending bosses having spaced ends and forming alined bearing apertures in said spaced ends.

HANS BUCHHOLZ.